United States Patent

[11] 3,626,921

| [72] | Inventor | Richard L. Lane |
| | | Penfield, N.Y. |
| [21] | Appl. No. | 880,694 |
| [22] | Filed | Nov. 28, 1969 |
| [45] | Patented | Dec. 14, 1971 |
| [73] | Assignee | Kayex Corporation |

[54] ABRASIVE CUTTING ELEMENT
7 Claims, 3 Drawing Figs.

[52] U.S. Cl.................................................. 125/15,
    51/206 R
[51] Int. Cl.................................................. B28d 1/04
[50] Field of Search........................................ 125/15, 22;
    51/206

[56]          References Cited
          UNITED STATES PATENTS

| 3,491,742 | 1/1970 | Weiss............................ | 125/15 |
| 3,146,561 | 9/1964 | Lindblad........................ | 125/15 X |
| 1,989,074 | 1/1935 | Bullard.......................... | 51/206 |
| 1,977,952 | 10/1934 | Offenbacker.................. | 51/206 |

*Primary Examiner*—Harold D. Whitehead
*Attorney*—Lloyd F. Seebach

ABSTRACT: A sawblade having an abrasive grid bonded to an edge so as to form a cutting portion. The surfaces of the sawblade at the edge to which the abrasive grit is bonded are convergent or tapered toward each other and the outer surfaces of the abrasive grit forming the cutting portion are also convergent or tapered in an opposite sense so that the cutting portion has additional thickness and is provided with a cutting clearance angle.

PATENTED DEC 14 1971   3,626,921

RICHARD L. LANE
INVENTOR.

BY
*Lloyd F. Seebach*
AGENT

ABRASIVE CUTTING ELEMENT

FIELD OF THE INVENTION

The invention relates to an abrasive cutting element and more particularly to a diamond abrasive sawblade in which the cutting portion of the sawblade has a configuration providing greater strength and such that a cutting clearance angle can be provided.

DESCRIPTION OF THE PRIOR ART

For the cutting of hard materials such as quartz, germanium, silicon and the like, sawblades having a deposit of diamond bort or other abrasive grit on an edge thereof have been used in an attempt to obtain an increase in the life of the sawblade, to obtain a reduction in waste of the material being cut and to produce a cut surface that is extremely smooth so that in most instances it will require no further lapping or polishing. In sawblades of this type, the abrasive grit is usually applied in one or more deposits and extends from the edge to provide the cutting portion. In some instances, the deposit of abrasive grit also extends over and onto the surfaces of the sawblade, and in most instances, the cutting surfaces of the deposit are generally parallel to the surfaces of the sawblade. In instances where the deposit is irregular, that is, when the deposit has been made by a process other than molding or forming during plating, the cutting portion will usually have a bulbous shape. As a result, an excessive cutting width is obtained and, in general practice, the surfaces of such a cutting portion are not suitable for cutting materials of the type set forth above. Since the surfaces of the cutting portion, when molded during plating, are generally parallel to each other and the abrasive grit is not relieved, additional friction results from such a cutting edge and, consequently, the generation of considerable heat. While cutting liquids are used to both increase the cutting action, remove debris and reduce the generated heat, the smooth parallel surfaces of the sawblade do not permit the cutting liquid to flow into the cut for rapid removal of the frictionally generated heat or of the debris. It is well established in this art that heat causes not only sawblade damage, but also breakage of the slice or wafer of material being cut.

In the cutting of the materials mentioned above, the wafer that is required measures only a few thousandths of an inch in thickness and must be within critical tolerances with respect to thickness, parallelism of the opposite surfaces as well as smoothness of the surfaces. For example, such a wafer may be less than 0.010 inch thick and must be within 0.0001 inch of a specified thickness. Also, a wafer should have surfaces that are free of any visible cutting lines and preferably so smooth that a subsequent lapping operation will not be necessary.

SUMMARY OF THE INVENTION

A primary object of the present invention is to provide an improved sawblade having a cutting portion that provides the material being cut with a smoother surface than heretofore possible.

Another object of the invention is to provide an improved sawblade having a cutting portion of an abrasive grit along an edge and having a configuration such that the cutting surfaces thereof are convergent so as to provide a cutting clearance angle.

Further, another object of the invention is to provide an improved sawblade in which the surfaces along an edge thereof are convergent or tapered toward one another so that the deposit of abrasive grit on the surfaces thereof will be substantially increased so as to provide a cutting portion of additional strength and with an improved cutting action.

Still another object of the invention is to provide a sawblade having a thinner support and a thinner cutting portion so as to reduce kerf loss.

And yet another object of the invention is to provide a sawblade having a cutting portion formed without the use of molds so that the abrasive grit is relieved on the sides of the cutting portion.

Other objects and advantages of the invention will be apparent to those skilled in the art by the description which follows.

The above objects of the invention are obtained by providing a thin metal support as the sawblade and forming the surfaces along an edge thereof so that they converge or taper toward one another. A deposit of abrasive grit is bonded to the converging surfaces and extends from the edge of the support to form a cutting portion. The cutting portion has a thickness at its extremity that is greater than the thickness of the metal support and extends from the junction of the parallel surfaces and the converging surfaces thereof. In addition, the side surfaces of the cutting portion also converge toward one another but in an opposite sense to the convergence of the surfaces on the sawblade. With this enlargement of the cutting portion the amount of abrasive grit overlying the surfaces of the sawblade is increased considerably and the converging surfaces of the cutting portion provide a clearance angle that permits the cutting liquid to enter into the cut being made. As a result, surfaces having a very smooth surface with substantially no visible cutting lines can be obtained.

DESCRIPTION OF THE DRAWING

Reference is now made to the accompanying drawing in which like reference numerals designate like parts and wherein.

Description of the Preferred Embodiment

Figure 1:
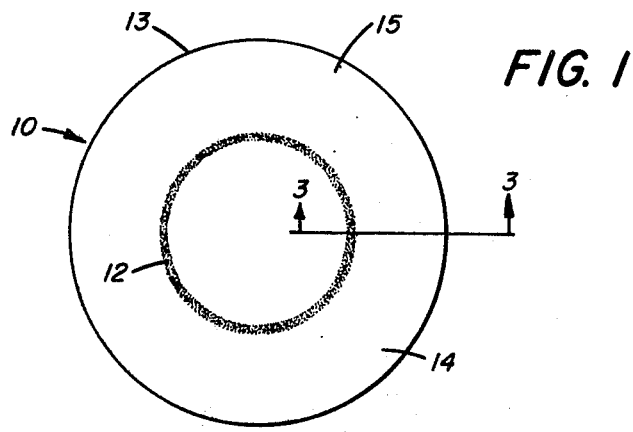
FIG. 1 is a plan view of an annular sawblade showing the cutting portion formed around an inner annular edge.
Figure 3:
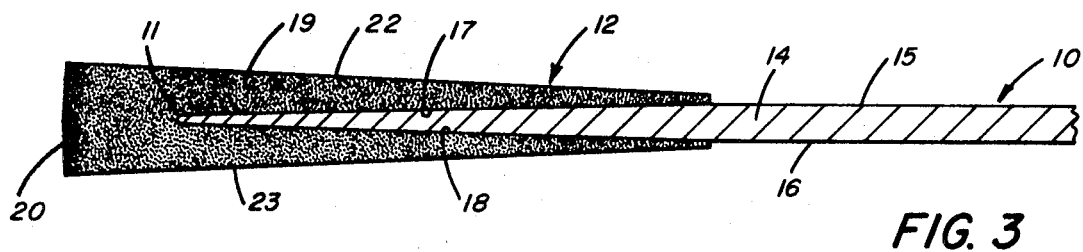
FIG. 3 is an enlarged sectional view taken along line 3—3 of FIG. 1 showing the tapered portion of the sawblade and the tapered surfaces of the cutting portion comprising a deposit of an abrasive grit.

With respect to FIG. 1, an annular sawblade 10 is shown in which the inner peripheral edge 11 is provided with a cutting portion 12. In accordance with the invention, the outer peripheral edge 13 could also be provided with a cutting portion, if the sawblade were to be used as a conventional cutting element. The support 14 for the sawblade comprises a thin metal, such as steel, phosphor bronze or the like, having surfaces 15 and 16 that are generally parallel and are formed into converging surfaces 17 and 18 as shown in FIG. 3. The converging surfaces 17 and 18 can be formed outwardly from the inner annular edge 11 or inwardly from the outer peripheral edge 13 in accordance with the manner in which the sawblade is to be used as a cutting element. The tape or convergence of surfaces 17 and 18 can be formed by grinding, rolling, chemically etching or electrochemically etching the surfaces. In any case, the length of the tapered or of the converging surfaces is at least 10 to 20 times the thickness of the support 14.

A deposit of abrasive grit, designated by numeral 19, is bonded to surfaces 17 and 18 and has an extremity 20 that lies or extends beyond edge 11 a distance that is at least twice that of the thickness of the support 14. The deposit of abrasive grit extends generally from the junction of the parallel surfaces 15 and 16 and the converging surfaces 17 and 18 along support 14 and beyond edge 11 to provide the cutting portion designated by the numeral 12. Surfaces 22 and 23 of cutting portion 12 are tapered in a direction opposite to that of surfaces 17 and 18 of support 14. In the process of depositing the abrasive grit along an edge of sawblade 14, the outer extremity thereof may have a bulbous configuration which is undesirable in that the cutting kerf is then considerably wider than would normally be desirable. As a result, surfaces 22 and 23 are ground to the desired thickness at extremity 20 and to a thickness at the junction that is slightly greater than the thickness of support 14. In this way the cutting portion 12 is provided with tapered surfaces and is substantially uniform in cross section throughout its length (radially), thereby providing a cutting clearance angle for the cutting portion and a cutting portion of increased strength due to its tapered configuration. The same result can be obtained by electrolytic machining (EDM or ECM) or sandblasting the surfaces 22 and 23.

Figure 2:
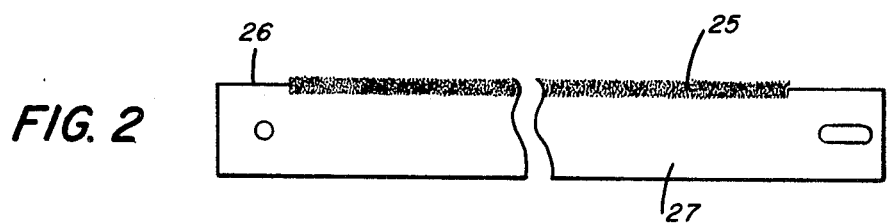
FIG. 2 is a side elevational view of a sawblade such as might be used in a bandsaw and having a cutting portion in accordance with the invention arranged along an edge.

Cutting portion 12 comprises an abrasive material, such as diamond particles, that are secured to the support 14 by a metal bond, such as nickel. While the grit is disclosed as diamond particles, other types of abrasive materials can also be used. As is well known in the art, the abrasive grit can be deposited on an edge of a support provided suitable masking members are used that would permit the deposit to be made by an electrolytic process. In FIG. 2 a cutting portion 25 is disclosed as being deposited along an edge 26 of a bandsaw blade designated by numeral 27. The general proportions of cutting portion 25 can be substantially the same as those disclosed with respect to the annular sawblade 10.

As an example and not as a limitation, the proportions of the cutting portion 12 can be generally as follows. With a support 14 that is about 0.004 inch in thickness the length of the tapered portions forming surfaces 17 and 18 can be about 0.040 inch for a sawblade having an outer diameter of about 6 inches and about 0.060 inch for a sawblade having a diameter of about 8 inches. Cutting portion 12 can have a thickness of about 0.006 inch at the junction of surfaces 15 and 16 with 17 and 18 and about 0.008 to 0.010 inch at extremity 20. Cutting portion 12 should extend beyond edge 11 at least 0.008 inch and, as shown in FIG. 3, increases uniformly in cross section from the junction of surfaces 15, 16 and 17, 18, respectively, to the extremity 20 and is bonded to surfaces 17 and 18.

The sawblade disclosed hereinabove provides for a greater amount of abrasive grit to be used in forming the cutting portion and to be in actual contact with the support member. Such a deposit as well as its configuration provides a cutting portion that has greater strength and, at the same time, provides a clearance cutting angle, so that a cutting liquid which might be used would have no problem in reaching the actual surfaces at which the cutting action takes place to reduce the heat and remove debris. Because of this structure, the surfaces of the material that are to be cut will be much smoother and substantially free of cutting lines.

While the description of the invention has been with respect to a preferred embodiment thereof it will be understood that variations and modifications can be effected within the spirit and scope of the invention.

I claim:

1. An abrasive sawblade, comprising:
   a thin, solid metal support having a central circular aperture and generally parallel side surfaces which converge toward each other along the edge of said aperture for supporting an abrasive cutting material; and
   a deposit of abrasive grit bonded to at least said converging surfaces and forming a continuous cutting portion extending into said aperture from said support and along said edge;
   said cutting portion having an extremity terminating beyond said edge and a thickness that is greater than said support at about the junction of said side surfaces and said converging surfaces and increases generally uniformly from said junction to said extremity.

2. An abrasive sawblade in accordance with claim 1 wherein said cutting portion extends beyond said edge and into said aperture for a distance that is at least twice that of the thickness of said support.

3. An abrasive sawblade in accordance with claim 1 wherein the overall radial length of said cutting portion is at least ten times the thickness of said support.

4. An abrasive sawblade in accordance with claim 1 wherein said continuous cutting portion has a width at said extremity about twice the thickness of said support and said extremity terminates at a distance radially from said edge that is greater than said width.

5. An abrasive sawblade in accordance with claim 6 wherein said cutting portion extends along the side surfaces of said support for a distance that is at least five times the distance that said extremity extends radially beyond said edge.

6. An abrasive sawblade, comprising:
   a thin, solid, annular metal member having generally parallel side surfaces which terminate at an inner peripheral edge forming a central aperture in said member and at an outer peripheral edge, a portion of said side surfaces adjacent said inner peripheral edge being tapered toward said aperture for supporting an abrasive cutting material;
   a deposit of abrasive grit bonded to at least the tapered portion of said side surfaces for forming a continuous cutting portion along said inner peripheral edge and extending into said aperture;
   said cutting portion having a thickness at the aperture end that is at least twice the thickness of said metal member and a thickness at the side surface end that is greater than the thickness of said metal member and less than the thickness at said aperture end;
   whereby the side surfaces of said cutting portion converge toward each other.

7. An abrasive sawblade in accordance with claim 6 wherein said metal member has a thickness from about 0.004 inch to about 0.010 inch, the tapered portion of said side surfaces has a radial length from about 0.040 inch to about 0.060 inch and said cutting portion has a thickness at said aperture end from about 0.008 inch to about 0.025 inch, at said side surface end from about 0.006 inch to about 0.012 inch and an overall radial length from about 0.048 inch to about 0.068 inch.

* * * * *